(No Model.)

W. B. MORRIS.
SULKY PLOW AXLE.

No. 520,934. Patented June 5, 1894.

Witnesses,
J. H. Houze
J. A. Bayless

Inventor,
William B. Morris
By Dewey & Co.
Atty

UNITED STATES PATENT OFFICE.

WILLIAM B. MORRIS, OF COLLINSVILLE, CALIFORNIA, ASSIGNOR TO E. I. UPHAM AND WM. EMINGTON, OF SAME PLACE.

SULKY-PLOW AXLE.

SPECIFICATION forming part of Letters Patent No. 520,934, dated June 5, 1894.

Application filed December 22, 1893. Serial No. 494,433. (No model.)

*To all whom it may concern:*

Be it known that I, WILLIAM B. MORRIS, a citizen of the United States, residing at Collinsville, county of Solano, State of California, have invented an Improvement in Sulky-Plow Axles; and I hereby declare the following to be a full, clear, and exact description of the same.

My invention relates to improvements in axles for sulky plows.

It consists of a short independent axle pivoted to the main axle beam, and a means for tilting it about its pivot pin so as to change the axle in a vertical plane, and thereby incline the wheel to any desired degree from a perpendicular.

Figure 1:
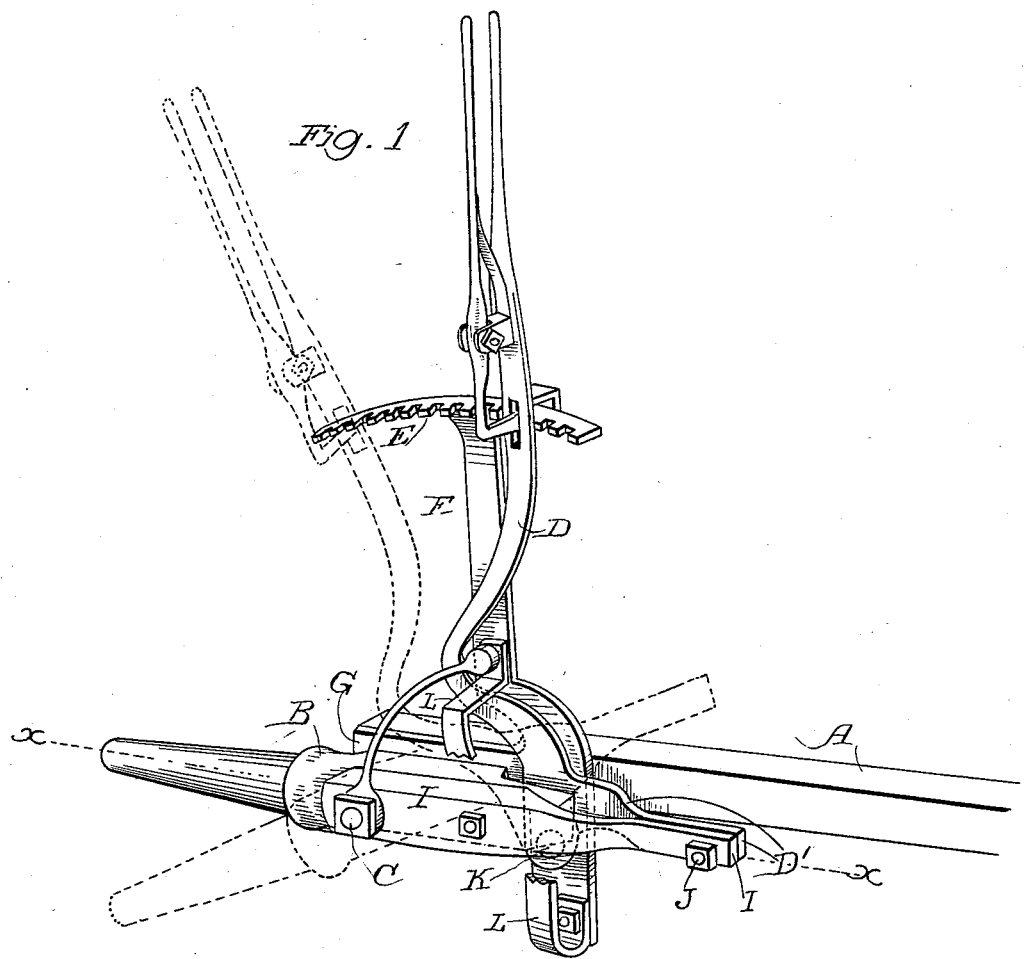
Figure 2:
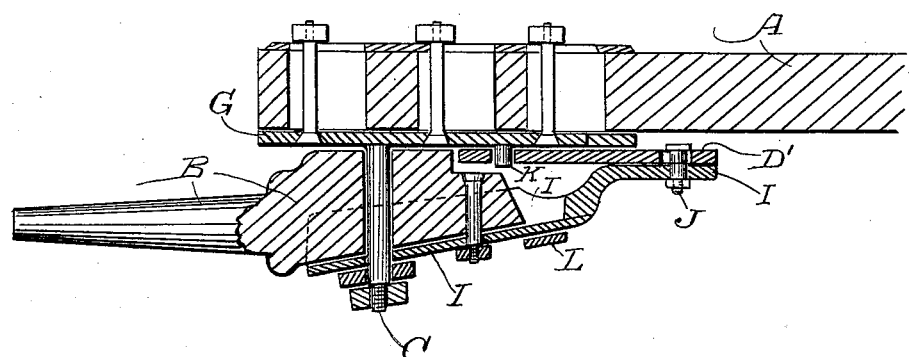

Referring to the accompanying drawings for a more complete explanation of my invention,—Figure 1 is a view of one end of the main axle showing the independent axle and the adjustable attachment to machines already constructed. Fig. 2 is a horizontal section on the line x—x of Fig. 1.

When plows are to be used upon a side hill, the tendency of the plow is to move away from the land so that if not counteracted, the line of the furrow will gradually incline down the hill instead of running approximately upon the same level. It has been customary to bend the axle at one end so that the wheel stands permanently in an inclined position, but this is only suitable for a certain inclination of the hill.

My invention is designed to provide an independent adjustable axle so that the wheel may be set at any desired angle to suit the inclination upon which the plow is traveling and to cause the plow to travel to or from the land in any desired degree.

A is the main axle and B the supplemental axle having a wheel adapted to turn upon its outer end. This supplemental axle is pivoted to the main axle, as shown at C. In new work it may be constructed, as shown in Fig. 1, having the lever D fitted into a socket in the movable portion B, and extending upwardly and adapted to engage a rack E which stands transversely to the direction of travel of the machine. This rack is supported upon a standard F which is bolted to the main axle A as shown or to other suitable part of the apparatus. By moving the lever D, the axle B may be made to stand essentially in line with the axle A, and the wheel upon it will then travel in a plane at right angles with the axle A, but when found necessary, the wheel is tilted to any desired degree by moving the lever D outwardly over the rack, thus tilting the wheel as shown.

When the apparatus is to be applied to a plow already constructed a plate G is bolted to the main axle A, this plate having the pin or stud C projecting outwardly from it and adapted to receive the independent tilting axle B which is fitted thereon. In this case the axle B is fitted into an inclosing box or casing I which has an extension at the inner end, and this is pivoted by a pin shown at J to the bell crank extension D' of the lever D. The lever D is fitted loosely upon a stud K which projects from the plate G, and serves as a fulcrum pin about which the lever turns. From this point, the lower end of the lever extends approximately parallel with the extension of the casing I as shown at D' and is pivoted to the end of the casing by the pin J.

A yoke L has its upper and lower ends secured to the standard F so that with the lower part of the standard, it forms a guide channel within which the swinging end of the axle or its extension box is guided as it moves up and down, and by which it is prevented from being wrenched or twisted to one side if the wheel strikes any obstruction.

Having thus described my invention, what I claim as new, and desire to secure by Letters Patent, is—

In a gang or sulky plow, the combination of the main axle having a permanent wheel upon one end, a plate secured to the opposite end with pivot pins or studs projecting therefrom, a supplemental axle journaled upon the outermost of these pivot pins and having a socketed inner end, a bell-crank lever the angle of which is fulcrumed upon the outer pin and whose inner lower end is extended, a box or casing fitting around and bolted to the inner end of the supplemental axle and having its inner end extended in line with and pivoted to the extension of the lower lever arm, and a yoke embracing and forming a guide and brace for the inner end of said supplemental axle, substantially as herein described.

In witness whereof I have hereunto set my hand.

WILLIAM B. MORRIS.

Witnesses:
S. H. NOURSE,
J. A. BAYLESS.